United States Patent [19]
Kimura et al.

[11] Patent Number: 6,145,614
[45] Date of Patent: Nov. 14, 2000

[54] FOUR-WHEEL DRIVE VEHICLE HAVING DIFFERENTIAL-LIMITING CONTROL

[75] Inventors: Takashi Kimura; Nobuhiro Hayashida, both of Fujisawa, Japan

[73] Assignee: Isuzu Motors Limited, Tokyo, Japan

[21] Appl. No.: 08/959,408

[22] Filed: Oct. 28, 1997

[30] Foreign Application Priority Data

Oct. 31, 1996 [JP] Japan .................................. 8-290731

[51] Int. Cl.$^7$ ................................................. B60K 17/344
[52] U.S. Cl. ........................ 180/248; 180/247; 180/142; 180/197
[58] Field of Search .................................. 180/248, 249, 180/250, 23; 303/190; 701/81, 82, 87, 89, 90; 280/91.1

[56] References Cited

U.S. PATENT DOCUMENTS

| | | | |
|---|---|---|---|
| 4,986,388 | 1/1991 | Matsuda | 180/248 |
| 5,070,961 | 12/1991 | Tezuka | 180/249 |
| 5,132,908 | 7/1992 | Eto | 180/248 |
| 5,396,421 | 3/1995 | Niikura | 180/248 |
| 5,701,247 | 12/1997 | Sasaki | 180/248 |
| 5,894,904 | 4/1999 | Yakou et al. | 180/247 |

FOREIGN PATENT DOCUMENTS 9190537  7/1989  Japan .................................. 180/248

*Primary Examiner*—Brian L. Johnson
*Assistant Examiner*—Daniel Yeagley
*Attorney, Agent, or Firm*—Rader, Fishman & Grauer PLLC

[57] ABSTRACT

A four-wheel drive vehicle of the present invention includes: a first differential mechanism for distributing engine drive force to front drive wheels and rear drive wheels; a second differential mechanism for distributing engine drive force to left and right main drive wheels (the main drive wheels get more drive force than other drive wheels); first differential-limiting device for operating differential-limiting control by the first differential mechanism; second differential-limiting device for operating differential-limiting control by the second differential mechanism; rotational speed detection device for detecting rotational speed of each drive wheel; turn direction detection device for detecting the direction of a turn that the vehicle is making; and control means for, based on detection signals from the rotational speed detection device and the turn direction detection device, controlling differential-limiting force provided by the second differential-limiting device according to a difference between the rotational speed of the left main drive wheel and that of the right main drive wheel, determining front and rear drive wheels on the outer side in the turn direction, and controlling differential-limiting force provided by the first differential-limiting device according to a rotational speed difference between the front and rear drive wheels on the outer side in the turn direction.

18 Claims, 2 Drawing Sheets

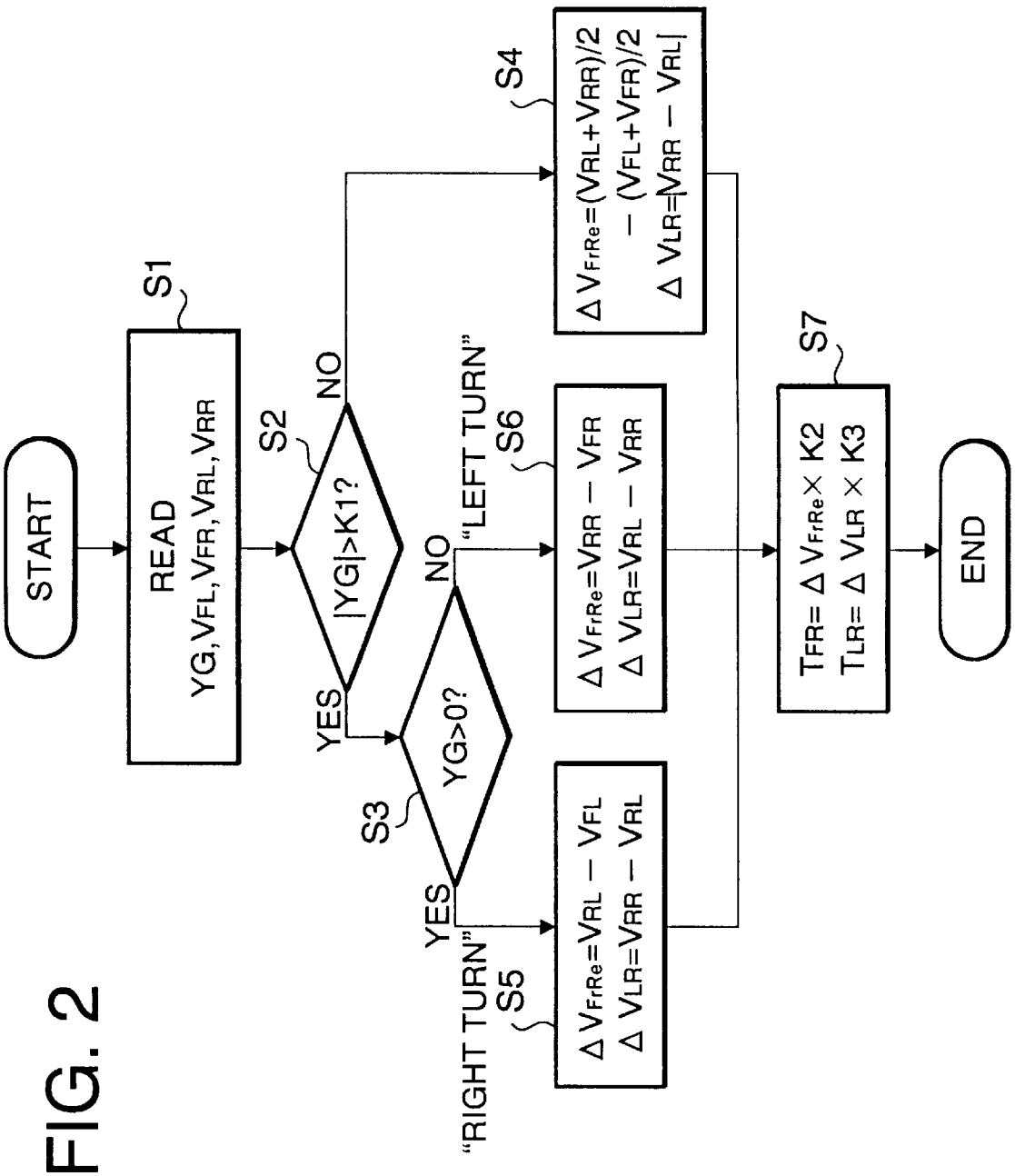

FOUR-WHEEL DRIVE VEHICLE HAVING DIFFERENTIAL-LIMITING CONTROL

BACKGROUND OF THE INVENTION

1. Technical Field

The present invention relates to a four-wheel drive vehicle, and more specifically, a four-wheel drive vehicle that is able to change both the distribution of driving force to front and rear wheels and the differential-limiting control of left and right drive wheels according to the running state of the vehicle.

2. Background Art

In some types of four-wheel drive vehicles, engine driving force is preferentially applied to rear wheels as main drive wheels in a normal condition such that the vehicle is driven only by the rear wheels, and in the case of slippage of these rear wheels, the engine driving force is also distributed to front wheels as slaved drive wheels such that the vehicle is driven by four wheels (what is called a four-wheel drive vehicle of FR base). In these types of four-wheel drive vehicles, output of a transmission is transferred to (first) differential mechanism (transfer mechanism) with differential-limiting functions and the most desirable distribution of torque adapted to the running state can be achieved by controlling differential-limiting by this first differential mechanism. A hydraulic multiple disc clutch is known as means for this differential-limiting, as shown in Japanese Patent Application 63-141831.

The driving force distributed to the main drive wheels (the rear wheels) is further distributed to each of the left and right wheels by way of another (second) differential mechanism. It is possible to construct this second differential mechanism as a limited slip differential by adding differential-limiting means such that the drive force of the vehicle can be reliably maintained even when slippage or the like occurs in one of the rear wheels. A hydraulic multiple disc clutch of a type mentioned above may be used as this differential-limiting means, as shown in Japanese Patent Application 62-103227. By controlling clutching force of the clutch and adjusting its differential-limiting force, a considerably desirable differential control adapted to the running state of the vehicle can be achieved.

Generally, the first differential mechanism described above controls differential limiting according to the difference between average rotational speed of the front wheels and that of the rear wheels, while the second differential mechanism controls differential-limiting according to the difference between rotational speed of the left rear wheel and that of the right rear wheel.

But when the first differential mechanism and the second differential mechanism are used in combination, problems as below may arise. Upon the occurrence of rotational speed difference between the left and right rear wheels (due to a turn or the like), the second differential mechanism performs differential-limiting control such that the rotational speed difference between the two rear wheels is eliminated, and after the elimination of the speed difference the differential-limiting force is removed. However, if the state of road and running (or the state of road and running that causes a rotational speed difference between the rear wheels) does not change, a rotational speed difference will probably occur again making the second differential mechanism operate another differential-limiting control, and the repetition of this will cause what is called hunting. This hunting problem may also occur when differential-limiting control by the second differential mechanism cannot catch up the changes in the road/running state. Once hunting occurs, it may change the rotational speed difference between the front wheels and the rear wheels, resulting in another hunting in the differential-limiting control by the first differential mechanism. As a result, the vehicle may experience irregular states such as oversteer or understeer and operational stability will significantly deteriorate.

SUMMARY OF THE INVENTION

The four-wheel drive vehicle according to the present invention includes: a first differential mechanism for distributing engine drive force to front drive wheels and rear drive wheels; a second differential mechanism for distributing the engine drive force distributed by the first differential mechanism to left and right main drive wheels (the main drive wheels get more drive force than other drive wheels); first differential-limiting means for operating differential-limiting control by the first differential mechanism; second differential-limiting means for operating differential-limiting control by the second differential mechanism; rotational speed detection means for detecting rotational speed of each drive wheel; turn direction detection means for detecting the direction of a turn that the vehicle is making; and control means for, based on detection signals from the rotational speed detection means and the turn direction detection means, controlling differential-limiting force provided by the second differential-limiting means according to a difference between the rotational speed of the left main drive wheel and that of the right main drive wheel, determining front and rear drive wheels on the outer side in the turn direction, and controlling differential-limiting force provided by the first differential-limiting means according to a rotational speed difference between the front and rear drive wheels on the outer side in the turn direction.

When a vehicle turns, its wheels on the outer side in the turn direction generally rotate at an appropriate rotational speed with steadily gripping road surface. However, its wheels on the inner side in the turn direction tend to float and slip, generating rotational speed difference between the two sides (the outer and the inner) of wheels. The present invention thus focuses on the outer-side wheels and the first differential mechanism performs its differential-limiting control according to the difference between the rotational speed of the outer-side front wheel and that of the outer-side rear wheel. Due to this, torque distribution to the front wheels and the rear wheels can be adjusted independent of the rotational speed difference between the left main (rear) drive wheel and the right main (rear) drive wheel, preventing the occurrence of hunting and thus enhancing the operational stability.

BRIEF DESCRIPTION OF THE ACCOMPANYING DRAWINGS

FIG. 2 shows a control flow of a clutch of the four-wheel drive vehicle of FIG. 1.

DETAILED DESCRIPTION OF THE PREFERRED EMBODIMENTS

Figure 1:
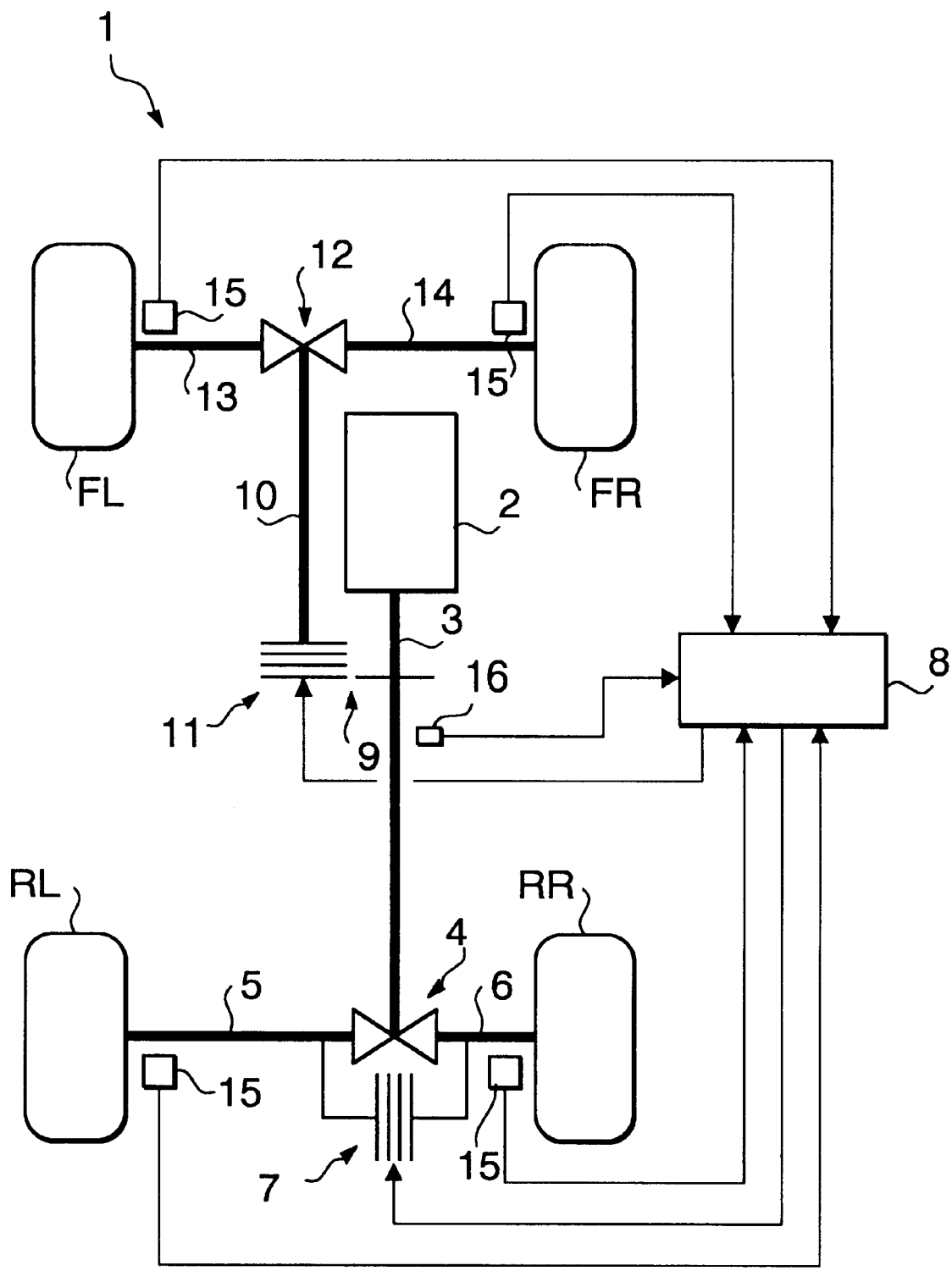
FIG. 1 shows an arrangement of a four-wheel drive vehicle according to the present invention.

Now, a preferred embodiment of the present invention will be described in details with reference to the accompanying drawings.

FIG. 1 shows an arrangement of a four-wheel drive vehicle according to the present invention. It should be noted that the front side of the vehicle is drawn in the upper of the drawing. As shown, the four-wheel drive vehicle 1 has a rear wheel-side output shaft 3 rearwardly extended from a transmission 2. The rear end of the rear wheel side output shaft 3 is connected to a rear wheel-side differential mechanism 4 (a second differential mechanism). The rear wheel-side differential mechanism 4 is constructed similar to a common differential device or a final reduction gear. A pair of rear wheel-side drive shafts 5, 6 extend left and right from the rear wheel-side differential mechanism 4 and each end of the drive shaft 5, 6 is connected to the left rear wheel RL, the right rear wheel RR, respectively. The rear wheel-side differential mechanism 4 distributes the driving force transferred from the rear wheel-side output shaft 3 to each of the left and right rear wheels RL, RR by way of the rear wheel-side drive shafts 5, 6. In addition, the rear wheel-side differential mechanism 4 allows differential motion of the left and right rear wheels RL, RR and the rear wheel-side drive shafts 5,6. In short, the four-wheel drive vehicle 1 is a four-wheel drive vehicle of FR (front, rear) base in which the rear wheels RL, RR constitute main drive wheels that are constantly driven.

A hydraulic multipledisc clutch 7 (second differential-limiting means) is provided in the rear wheel-side differential mechanism 4. That is, the rear wheel-side differential mechanism 4 is constructed as a limited slip differential such that the differential motion of the left and right rear wheels RL, RR can be appropriately limited by controlling the clutching force of the clutch 7. An ECU (electronic control unit) 8 or the like as control means transmits control signals to the clutch 7 and hydraulic pressure is supplied from the hydraulic circuit (not shown) based on these control signals. The multiple disc clutch 7 is then let in according to the hydraulic pressure.

On the other hand, a transfer mechanism 9 is provided on the midway of the rear wheel-side output shaft 3 and the transfer mechanism 9 transfers some of the engine drive force that has been output from the transmission 2 according to the necessity and distributes it to front wheel-side output shaft 10. Accordingly, the rest of the drive force still remaining after this transfer to the front wheels is transferred to the rear wheels RL, RR. The transfer mechanism 9 also has a hydraulic multiple disc clutch 11 (first differential-limiting means). Drive force or torque is distributed (transferred) to the front wheels FL, FR by clutching operation of the clutch 11. The distribution of torque to the front wheels FL, FR can be steplessly regulated by controlling the clutching force of the clutch 11 with the ECU 8 as is done in the clutch 7. When the clutch 11 is not engaged with the front wheels FL, FR at all, no torque is distributed to the front wheels FL, FR. Conversely, when the clutch 11 is fully engaged with the front wheels FL, FR, a half or less than a half of all the torque is distributed to the front wheels FL,FR.

The front-wheel side output shaft 10 forwardly extends from the transfer mechanism 9 and is connected to front-wheel side differential mechanism 12. The front wheel side differential mechanism 12 is constructed similar to the rear-wheel side differential mechanism 4. A pair of front-wheel side drive shafts 13, 14 extend left and right from the front-wheel side differential mechanism 12, with each end of the drive shaft 13,14 connected to the left and right front wheels FL, FR, respectively.

Accordingly, the front wheels FL, FR are slave wheels to which drive force is provided only when the clutch 11 is in its clutched position. The transfer mechanism 9 includes the differential mechanism 12 (the first differential mechanism) that distributes and transfers engine drive force to the front and rear wheels with allowing differential motion of the front wheels FL, FR and the rear wheels RL, RR. The differential motion allowed by the transfer mechanism 9 is limited in an adequate way by the clutch 11.

Further, the four-wheel drive vehicle 1 is provided with rotational speed sensors 15 (wheel rotational speed detection means) for detecting rotational speed $V_{FL}$, $V_{FR}$, $V_{RL}$, $V_{RR}$ of each of the drive wheels (the front wheels FL, FR and the rear wheels RL, RR), and a transverse acceleration sensor 16 (turn direction detection means) for detecting transverse acceleration (acceleration in the transverse direction) YG of the vehicle. These sensors 15, 16 output their detection signals to the ECU 8, respectively. The transverse acceleration sensor 16 outputs a plus value when it detects transverse acceleration to the left direction, or outputs a minus value when it 16 detects transverse acceleration to the right direction.

FIG. 2 shows a control flow of the clutches 7, 11 under the control of the ECU 8. Initially, at step S1, the ECU 8 reads each rotational speed $V_{FL}$, $V_{FR}$, $V_{RL}$, $V_{RR}$ of the front wheels FL, FR and the rear wheels RL, RR, as well as the transverse acceleration YG of the vehicle, from the detection signals from the rotational speed sensors 15 and the transverse acceleration sensor 16.

Next, at step S2 the ECU 8 compares the absolute value of the transverse acceleration YG with a predetermined threshold value K1 (a constant). If the absolute value is larger than K1, the ECU 8 determines that the vehicle is turning and proceeds to step S3. If the absolute value is equal to K1 or less than K1, it 8 determines that the vehicle 1 is running straight and proceeds to step S4.

At step S3, the direction of the turn of the vehicle is determined according to the value of the transverse acceleration YG. If YG is larger than zero, the turn is determined to be a right turn and the ECU proceeds to step S5. On the other hand, it YG is equal to or less than zero, the turn is determined to be a left turn and the ECU proceeds to step S6.

At step S5, S6 and S4, the difference between the rotational speed of the front wheels and that of the rear wheels $\times V_{FrRe}$ (the rotational speed difference $\Delta V_{FrRe}$), and the difference between the rotational speed of the left rear wheel and that of the right rear wheel $\Delta V_{LR}$ (the rotational speed difference $\Delta V_{LR}$) are calculated from the rotational speed $V_{FL}$, $V_{FR}$, $V_{RL}$, $V_{RR}$ of each wheel. It should be noted that at S5 and S6 the rotational speed difference between the front and rear wheels that are on the outer side in the turn direction is calculated as the rotational speed difference $\Delta V_{FrRe}$ between the front and rear wheels.

The reason for calculating the rotational speed difference between the front and rear wheels that are on the outer side in the turn direction is as follows. When a vehicle is turning (making a turn), the wheels on the outer side in the turn direction receive heavier load than those on the inner side, thus enjoying steadier grip of the road surface and are less likely to have slippage and the like. Conversely, the wheels on the inner side in the turn direction receive smaller load and thus are more likely to have slippage, resulting in higher rotational speed. Due to this, using the rotational speed of the front and rear wheels on the outer side in the turn direction (these wheels enjoy steadier grip of the road surface than the inner-side ones as described above) for calculating the rotational speed difference $\Delta V_{FrRe}$ may result in a better control of the vehicle.

Specifically, $\Delta V_{FrRe}$ and $\Delta V_{LR}$ are calculated, when the turn is determined to be a right turn (step S5) as $\Delta V_{FrRe} = V_{RL} - V_{FL}$, $\Delta V_{LR} = V_{RR} - V_{RL}$, or when the turn is determined to be a left turn (Step S6) as $\Delta V_{FrRe}=V_{RR}-V_{FR}$, $\Delta V_{LR}=V_{RL}-V_{RR}$. When the vehicle is determined to be running straight (S4), $\Delta V_{FrRe}=(V_{RL}+V_{RR})/2-(V_{FL}+V_{FR})/2$, which is the difference between the average rotational speed of the front two wheels and that of the rear two wheels as is in the prior art. In this case, $\Delta V_{LR}$ is calculated as the absolute value of $V_{RR}-V_{RL}$. This means that in the present invention the calculation method of $\Delta V_{LR}$ when the vehicle is turning is substantially the same as that of the prior art. Further, either the vehicle is turning or running straight, if $\Delta V_{FrRe}$ is smaller than zero then $\Delta V_{FrRe}$ is determined to be zero. If $\Delta V_{LR}$ is smaller than zero when the vehicle is turning, $\Delta V_{LR}$ is determined to be zero.

Based on the values of $\Delta V_{FrRe}$ and $\Delta V_{LR}$ obtained as above, theoretical clutching force $T_{FR}$, $T_{LR}$ of the clutches 7, 11 are calculated at step S7, respectively. Then, control signals in accordance with these theoretical clutching force $T_{FR}$, $T_{LR}$ are output to the clutches 7, 11 for controllably and actually achieving these theoretical clutching force $T_{FR}$, $T_{LR}$ in the clutch 7,11. More specifically, the theoretical clutching force is calculated as $T_{FR}=\Delta V_{FrRe}\times K2$, $T_{LR}=\Delta V_{LR}\times K3$. K2 and K3 are predetermined constant values. Thus, in the present embodiment, the most desirable clutching force (differential-limiting force) can be controllably achieved based on the rotational speed difference between the front and rear wheels on the outer side in the turn direction, as well as on the rotational speed difference between the left and right rear wheels.

As described above, four-wheel drive vehicles of the prior art control the clutch between the front and rear wheels according to the difference between the average rotational speed of the front wheels and that of the rear wheels (or the rotational speed difference between the input and output shafts of the transfer mechanism) either the vehicle is making a turn or running straight. Due to this, if any hunting in the rotational direction occurs in the left and right rear wheels during a turn, the torque distribution to the front and rear wheels is disturbed by this hunting and another hunting may occur in the torque distribution of the front and rear wheels, resulting in an extremely unstable running condition.

However, in the arrangement of the present invention, as the rotational speed difference between the front and rear wheels on the outer side in the turn direction is calculated and the torque distribution to the front and rear wheels is controlled only according to this rotational speed difference (the front and rear wheels on the inner side in the turn direction are neglected), very stable control that is not affected by the degree of slippage of the wheels on the inner side in the turning direction can be achieved. Therefore, a four-wheel drive vehicle of the present invention demonstrates an extremely stable running characteristics even when the vehicle is turning, significantly enhancing its operational stability and acceleration functions.

The present invention is not limited to the above described preferred embodiment but may be realized in any other possible embodiments. For example, a steering angle sensor or the like may be used as the turn direction detection means. Also, any suitable devices other than the hydraulic multiple disc clutch may be used as the differential-limiting means. In addition, the present invention may be applied to any vehicles of FF base of which front wheels are driven as main drive wheels.

What is claimed is:

1. A four-wheel drive vehicle comprising:
    a first differential mechanism for distributing engine drive force to front drive wheels and rear drive wheels, either the front drive wheels or the rear drive wheels being used as main drive wheels and the other drive wheels being used as slave drive wheels;
    a second differential mechanism for distributing the engine drive force that has been distributed by the first differential mechanism to left and right main drive wheels, the main drive wheels get more drive force than the slave drive wheels;
    first differential-limiting means for operating differential-limiting control of the first differential mechanism;
    second differential-limiting means for operating differential-limiting control of the second differential mechanism;
    rotational speed detection means for detecting rotational speed of each drive wheel;
    turn direction detection means for detecting the direction of a turn that the vehicle is making; and
    control means for, based on detection signals from the rotational speed detection means and the turn direction detection means, controlling differential-limiting force provided by the second differential-limiting means according to a difference between the rotational speed of the left main drive wheel and that of the right main drive wheel, determining front and rear drive wheels on the outer side in the turn direction by comparing an absolute value of an output from the turn direction detection means with a predetermined threshold value and determining the turn direction according to plus/minus of the output, and controlling differential-limiting force provided by the first differential-limiting means according to a rotational speed difference between the front and rear drive wheels on the outer side in the turn direction.

2. The four-wheel drive vehicle of claim 1, wherein the rear drive wheels are the main drive wheels and the front drive wheels are the slave drive wheels.

3. The four-wheel drive vehicle of claim 1, wherein the first differential-limiting means and the second differential-limiting means are hydraulic multiple disk clutches.

4. The four-wheel drive vehicle of claim 3, wherein the turn direction detection means is a transverse acceleration sensor.

5. The four-wheel drive vehicle of claim 1, wherein the turn direction detection means is a transverse acceleration sensor.

6. The four-wheel drive vehicle of claim 5, wherein the control means determines whether the vehicle is turning or not by comparing the absolute value of an output from the turn direction detection means with a predetermined threshold value, and then determines the turn direction according to plus/minus of the output if the vehicle has been determined to be turning, and further determines the front and rear wheels that are located on the outer side in the turn direction.

7. The four-wheel drive vehicle of claim 1, wherein the control means determines whether the vehicle is turning or not by comparing the absolute value of an output from the turn direction detection means with a predetermined threshold value, and then determines the turn direction according to plus/minus of the output if the vehicle has been determined to be turning, and further determines the front and rear wheels that are located on the outer side in the turn direction.

8. A four-wheel drive vehicle comprising:
    a first differential mechanism for distributing engine drive force to front drive wheels and rear drive wheels, either the front drive wheels or the rear drive wheels being used as main drive wheels and the other drive wheels being used as slave drive wheels;

a second differential mechanism for distributing the engine drive force that has been distributed by the first differential mechanism to left and right main drive wheels, the main drive wheels get more drive force than the slave drive wheels;

first differential-limiting means for operating differential-limiting control of the first differential mechanism;

second differential-limiting means for operating differential-limiting control of the second differential mechanism;

rotational speed detection means for detecting rotational speed of each drive wheel;

turn direction detection means for detecting the direction of a turn that the vehicle is making; and control means for, based on detection signals from the rotational speed detection means and the turn direction detection means, controlling differential-limiting force provided by the second differential-limiting means according to a difference between the rotational speed of the left main drive wheel and that of the right main drive wheel, determining front and rear drive wheels on the outer side in the turn direction, and controlling differential-limiting force provided by the first differential-limiting means according to only a rotational speed difference between the front and rear drive wheels on the outer side in the turn direction.

9. The four-wheel drive vehicle of claim 8, wherein the rear drive wheels are the main drive wheels and the front drive wheels are the slave drive wheels.

10. The four-wheel drive vehicle of claim 8, wherein the first differential-limiting means and the second differential-limiting means are hydraulic multiple disk clutches.

11. The four wheel drive vehicle of claim 10, wherein the turn direction detection means is a transverse acceleration sensor.

12. The four-wheel drive vehicle of claim 10, wherein the control means determines whether the vehicle is turning or not by comparing the absolute value of an output from the turn direction detection means with a predetermined threshold value, and then determines the turn direction according to plus/minus of the output if the vehicle has been determined to be turning, and further determines the front and rear wheels that are located on the outer side in the turn direction.

13. The four-wheel drive vehicle of claim 8, wherein the turn direction detection means is a transverse acceleration sensor.

14. The four-wheel drive vehicle of claim 13, wherein the control means determines whether the vehicle is turning or not by comparing the absolute value of an output from the turn direction detection means with a predetermined threshold value, and then determines the turn direction according to plus/minus of the output if the vehicle has been determined to be turning, and further determines the front and rear wheels that are located on the outer side in the turn direction.

15. The four-wheel drive vehicle of claim 8, wherein the control means determines whether the vehicle is turning or not by comparing the absolute value of an output from the turn direction detection means with a predetermined threshold value, and then determines the turn direction according to plus/minus of the output if the vehicle has been determined to be turning, and further determines the front and rear wheels that are located on the outer side in the turn direction.

16. A method of distributing engine torque to front and rear drive wheels of a four-wheel drive vehicle, comprising:

determining which drive wheels, front or rear, are used as main drive wheels;

detecting rotational speed of each drive wheel;

detecting a direction of turn that a vehicle is making;

determining front and rear drive wheels on the outer side in the turn direction based on the detected rotational speed and direction of turn;

distributing engine torque to the front and rear drive wheels in such a manner that larger engine torque is distributed to the main drive wheels, based on only a rotational speed difference between the front and rear drive wheels on the outer side in the turn direction; and distributing engine torque that has been distributed to the main drive wheels further to left and right main drive wheels based on a difference between the rotational speed of the left main drive wheel and that of right main drive wheel.

17. The method of claim 16, wherein the rear drive wheels are the main drive wheels.

18. The method of claim 16, wherein whether the vehicle is turning or not is determined by comparing the absolute value of an output from a turn direction sensor with a predetermined threshold value.

* * * * *